(12) United States Patent
Osborn (10) Patent No.: US 7,890,236 B2
(45) Date of Patent: Feb. 15, 2011

(54) AUTOMATED CONTROL MODULE FOR A POWER MACHINE

(75) Inventor: Jason A. Osborn, Oakes, ND (US)

(73) Assignee: Clark Equipment Company, West Fargo, ND (US)

( * ) Notice: Subject to any disclaimer, the term of this patent is extended or adjusted under 35 U.S.C. 154(b) by 349 days.

(21) Appl. No.: 11/842,421

(22) Filed: Aug. 21, 2007

(65) Prior Publication Data

US 2009/0055057 A1    Feb. 26, 2009

(51) Int. Cl.
*G06F 7/70* (2006.01)

(52) U.S. Cl. ............................. 701/50; 701/33; 701/36; 701/49; 172/9

(58) Field of Classification Search ............... 701/49, 701/50, 207, 33, 36; 172/4.5, 9
See application file for complete search history.

(56) References Cited

U.S. PATENT DOCUMENTS

| | | | |
|---|---|---|---|
| 4,162,708 A | 7/1979 | Johnson | 172/4.5 |
| 4,231,700 A | 11/1980 | Studebaker | 414/700 |
| 5,649,600 A | 7/1997 | Marsh | 172/4.5 |
| 6,030,169 A | 2/2000 | Rossow et al. | 414/680 |
| 6,112,839 A | 9/2000 | Ostler et al. | 180/53.4 |
| 6,364,028 B1 | 4/2002 | Ferrell et al. | 172/1 |
| 6,470,250 B2 | 10/2002 | Nishizaki et al. | 701/48 |
| 6,470,251 B1 | 10/2002 | Enix | 701/50 |
| 2001/0045032 A1 | 11/2001 | Kleffner | 37/466 |
| 2003/0147727 A1 | 8/2003 | Fujishima et al. | 414/200 |
| 2004/0133327 A1 | 7/2004 | Ishimoto et al. | 701/50 |
| 2008/0036617 A1* | 2/2008 | Arms et al. | 340/679 |

FOREIGN PATENT DOCUMENTS

| | | |
|---|---|---|
| EP | 0 824 860 | 7/1997 |
| WO | 00/20989 | 4/2000 |

OTHER PUBLICATIONS

"Notification of Transmittal of the International Search Report and the Written Opinion of the International Searching Authority, or the Declaration" for PCT/US2008/009812, filed Aug. 15, 2008; 18 pages.

\* cited by examiner

*Primary Examiner*—Gertrude Arthur Jeanglaud
(74) *Attorney, Agent, or Firm*—Deirdre Megley Kvale; Westman, Champlin & Kelly, P.A.

(57) ABSTRACT

The application discloses an automated control module, which is configured to receive an input signal from a sensor and generate a universal control signal that can be processed by different machine controllers having different control configurations. In one embodiment the universal control signal is transmitted to a machine controller on the power machine through a connection assembly including a connector plug and socket. In another embodiment, the universal control signal is transmitted through a wireless interface. The machine controller processes the universal control signal and outputs a device control signal to operate different devices "on board" the power machine.

20 Claims, 6 Drawing Sheets

AUTOMATED CONTROL MODULE FOR A POWER MACHINE

BACKGROUND

Power machines, such as skid steer loaders or diggers include one or more lift arms or other devices that support or actuate an implement or tool. The lift arms or other devices are typically operated or actuated hydraulically via input from operator controls. The operator input is used to generate a control signal to energize hydraulic circuitry to actuate the lift arms or other devices. Different models or manufacturers utilize different circuit configurations for hydraulically operating the lift arms or other devices of the power machine. The different circuit configurations make it difficult to adapt the power machine for automated control. The present invention addresses these and other issues and provides advantages over prior control systems.

SUMMARY

The present invention relates to a control assembly including an automated control module. In illustrated embodiments, the automated control module is configured to receive a signal from a sensor and generate a universal control signal that can be processed by different machine controllers having different control configurations to generate a device-specific control signal for one or more components of the power machine. In one embodiment, the universal control signal is transmitted to a machine controller on the power machine through a connector assembly including a connector plug and socket. In another embodiment, the universal control signal is transmitted through a wireless interface. The machine controller processes the universal control signal and outputs a device-specific control signal to operate different devices on board the power machine.

DETAILED DESCRIPTION OF ILLUSTRATIVE EMBODIMENTS

Figure 1:
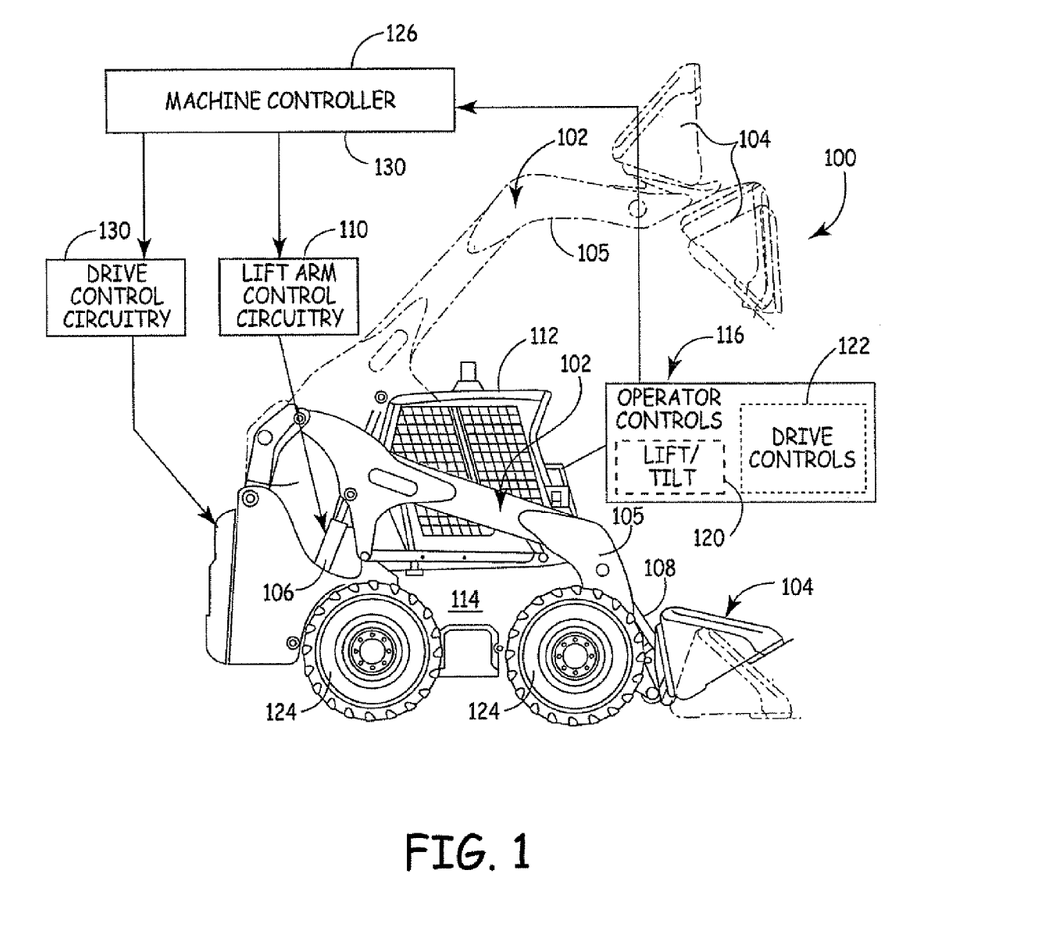
FIG. 1 is an illustration of a power machine including operator controls that interface with a machine controller.

The application discloses embodiments of a control application or assembly implementable on a power machine 100 of the type illustrated in FIG. 1. The power machine 100 illustrated in FIG. 1 is a skid steer loader including a bucket attachment, however, application of the control system described herein is not limited to a skid steer loader or the particular skid steer loader illustrated in FIG. 1. For example, other implements or tools can be coupled to different power machines or vehicles and controlled via embodiments of the control system described herein.

As shown in FIG. 1, the illustrated power machine 100 includes a lift arm assembly 102, which in the illustrated embodiment supports a bucket 104. The lift arm assembly 102 includes a plurality of lift arms 105 (only one lift arm visible in FIG. 1) to raise and lower the bucket 104 or other attachment. Lift arms 105 of the lift arm assembly 102 are raised and lowered hydraulically via a lift cylinder 106 or other actuator device. The bucket 104 or other attachment is pivotally coupled to the lift arms 105 to adjust an orientation or tilt of the bucket or attachment relative to the lift arms 105. The orientation or tilt is adjusted via operation of one or more tilt cylinders 108 or other actuator device. Operation of the lift and tilt cylinders 106, 108 is controlled via lift arm control circuitry 110 as schematically illustrated in FIG. 1. The lift arm circuitry 110 controls hydraulic flow to the hydraulic cylinders 106, 108 through various valves or other hydraulic circuitry as will be appreciated by those skilled in the art.

As shown in FIG. 1, the illustrated power machine or vehicle 100 includes an operator cab 112 supported relative to a body or frame 114 of the vehicle. The cab 112 includes via various operating controls 116 (illustrated schematically) to drive or operate the vehicle. The operating controls 116 include lift/tilt operating controls 120 to raise, lower and/or orient the bucket or other attachment as well as drive controls 122 to impart forward, reverse or steer motion to the power machine or vehicle through wheels 124. Illustratively the operator controls 116 include various levers, buttons or joystick devices to input commands to control lift, drive or other functions of the power machine or vehicle.

As shown in FIG. 1, input from the operator controls 116 is provided to a machine controller 126. The machine controller 126 processes the input from the operator controls 116 to operate the lift arm assembly and drive functions of the power machine. In particular, the machine controller 126 provides input to drive control circuitry 130 to impart forward, reverse and steer motion to the power machine or vehicle and input to the lift arm control circuitry 110 to raise/lower or orient the bucket 104 or other attachment.

Figure 2:
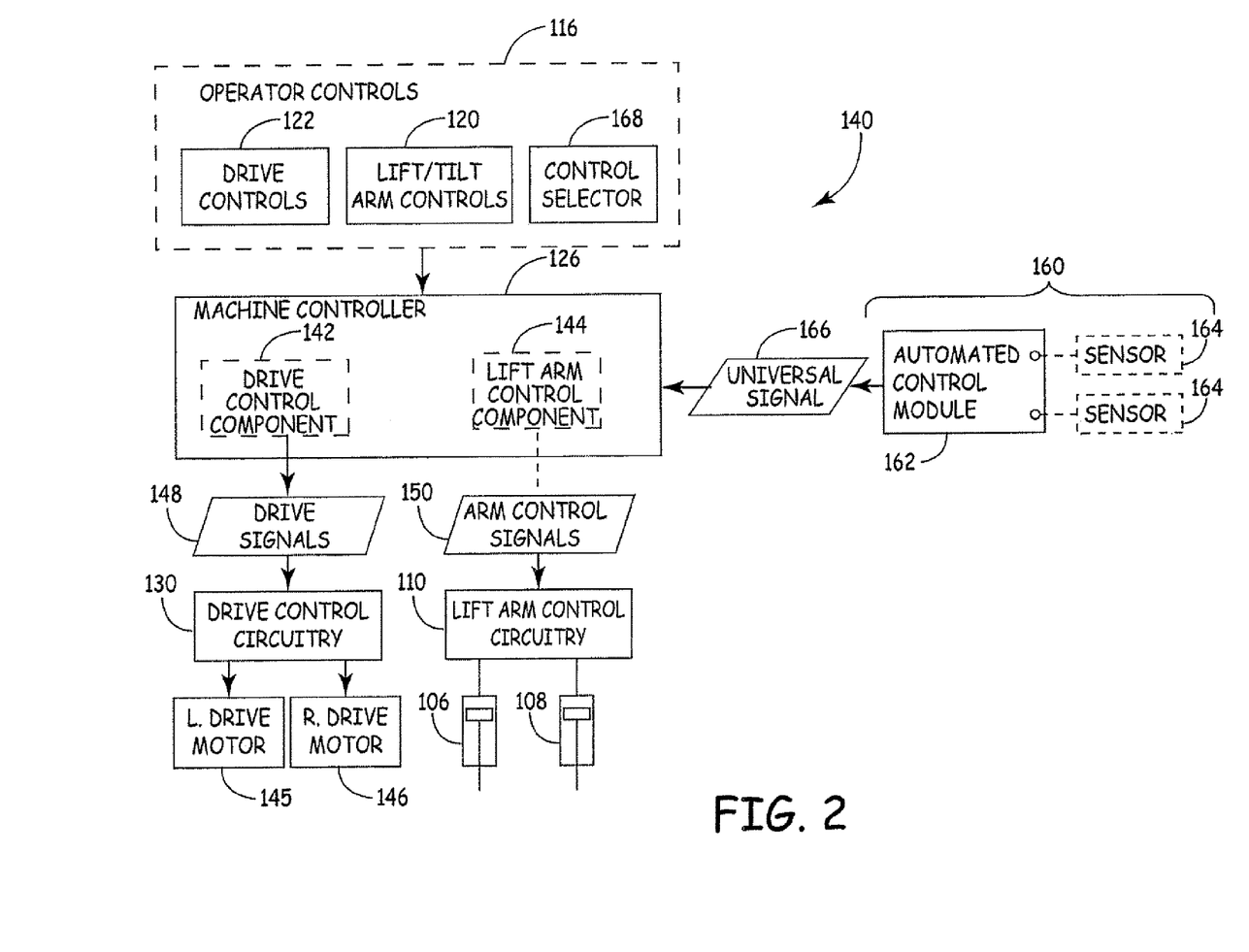
FIG. 2 is a schematic illustration of a control assembly for a power machine including automated machine control.

FIG. 2 illustrates an embodiment of a control assembly for the vehicle of the type illustrated in FIG. 1. Although the power machine illustrated in FIG. 1 is a wheeled vehicle, application is not limited to wheeled vehicles and embodiments disclosed herein can be adapted for a track vehicle or other vehicles as will be appreciated by those skilled in the art.

As shown in FIG. 2, the control assembly 140 includes operator and automated control components to provide automated and user operator control of the power machine or vehicle. In the illustrated embodiment, control assembly 140 includes a drive control component 142 and a lift arm control component 144. The drive control component 142 operates left drive motor 145 and right drive motor 146 through the drive control circuitry 130. In the illustrated embodiment, the left and right drive motors 145, 146 are hydrostatic motors and the drive control circuitry 130 includes various valves and components that provide hydraulic fluid flow to the left and right drive motors 145, 146 to drive and steer the power machine in response to drive signals 148 generated by the drive control component 142.

The lift arm control component 144 operates the lift and tilt cylinders 106, 108 through the lift arm control circuitry 110. Illustratively, the control circuitry 110 includes various valves and components that provide hydraulic fluid flow to lift and tilt cylinders 106, 108 to raise, lower or tilt an implement or tool coupled to the lift arm assembly 102. The hydraulic fluid flow is controlled in response to the arm control signal 150 generated by the lift arm control component 144.

As previously described, the machine controller 126 receives input from operator controls 116. In the illustrated embodiment, drive control input 122 is processed by the drive control component 142 to generate the drive signals 148 to energize the left and right drive motors 145, 146 to impart forward, reverse or steer motion. Lift/tilt control input 120 is processed by the lift arm control component 144 to generate the arm control signal 150 to operate the lift and tilt functions. The lift arm control component 144 is programmed to include device specific control parameters, such as how much current is needed to move the hydraulic cylinder 106, 108 a specified distance. The lift arm control component 144 utilizes these device specific parameters to generate the arm control signal 150.

As shown, in the illustrated embodiment, machine controller 126 also utilizes input from an automated control assembly 160 to operate the power machine. In the illustrated embodiment, the automated control assembly 160 includes an automated control module 162, which as shown is configured to receive input from one or more sensors 164 as shown. In the illustrated embodiment, the automated control module 162 generates a universal signal 166 based upon the input from the one or more sensors 164. The universal control signal 166 is transmitted to the machine controller 126 to generate a device-specific control signal.

Illustratively, sensors 164 include laser receivers or other sensor devices, which provide an electrical signal to locate a position of the power machine or components on the power machine relative to a reference position. To provide automated control of the lift arm assembly 102, the universal signal 166 is transmitted to the lift arm control component 144. The lift arm control component 144 uses the programmed device parameters to generate the device specific control signal.

Thus as described, the universal signal 166 is adapted for use for different control components and circuitry and thus can be adapted for use on machines having different control configurations. In the illustrated embodiment, the universal signal 166 generated by the automated control module 162 includes a position signal, which is utilized to generate the device specific control signal to actuate or energize on-board devices (e.g. hydraulic cylinders 106, 108) in response to location input from the sensors 164.

As shown, in FIG. 2, the machine can be operated based upon user input through the operator controls 116 and/or based upon sensor input through the automated control module 162. In the illustrated embodiment, the operator controls 116 include a control selector 168 to allow the operator to choose user based control or automated control. Illustratively, the control selector 168 can be a toggle switch or other device that allows the user to switch between user control and automated control.

Figure 3:
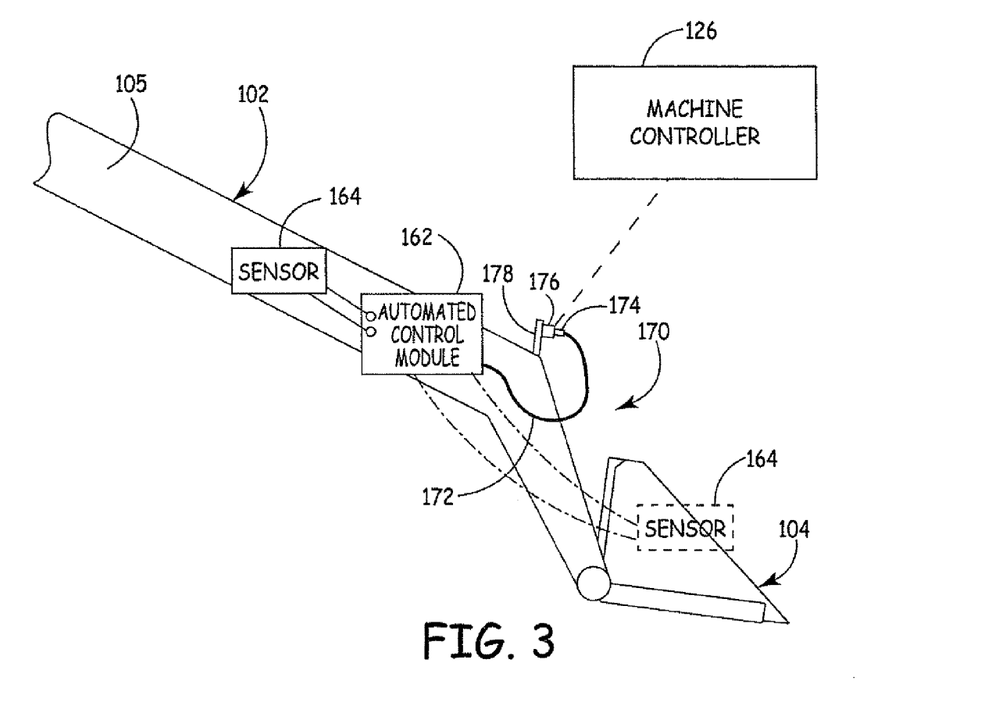
FIG. 3 is a schematic illustration of a lift arm of a power machine including an automated control module and sensors coupled to the lift arm.

FIG. 3 illustrates an embodiment of an automated control assembly. In the illustrated embodiment, the automated control module 162 is attached to the lift arm 105 of the power machine and receives input from one or more sensors 164 coupled to the lift arm 105 or attachment (e.g. bucket 104). The one or more sensors 164 are coupled to the lift arm 105 or attachment to provide position information for the lift arm 105 or attachment.

As previously described, input from the one or more sensors 164 is processed by the automated control module 162 to generate the universal control signal 166. The universal control signal 166 is transmitted to the machine controller 126 to control functions of the power machine, for example lift and tilt functions, as previously described. In the embodiment shown, the automated control module 162 is removably attached to the lift arm. Sensors are mounted remote from the automated control module 162 and are electrically connected to the automated control module 162 via wires.

In the embodiment shown in FIG. 3, the automated control module 162 is electrically coupled to one or more machine controllers 126 through a connector assembly 170. The connector assembly 170 includes an electrical cable 172 and connector plug 174 that is insertable into an electrical socket or port 176 to removably connect the automated control module 162 to the machine controller 126. In the illustrated embodiment, the cable 172 and connector plug 174 are connected to the automated control module 162 and the connector plug 174 is inserted into socket 176 connected to the power machine via a bracket or support 178. The socket 176 is electrically coupled to the machine controller 126 to provide the electrical interface between the automated control module 162 and the machine controller 126 when the connector plug 174 is inserted into the socket 176.

Alternatively, the automated control module 162 includes socket 176 and the automated control module 162 is electrically connected to the machine controller 126 via a cable (not shown) "on-board" the power machine to provide the electrical interface to the machine controller 126 as previously described.

Figure 4:
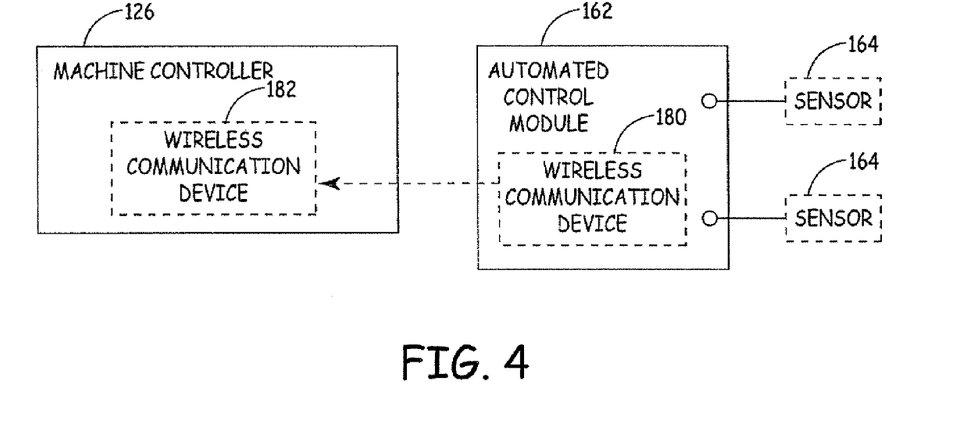
FIG. 4 is a schematic illustration of a wireless interface for an automated control module for automated machine control.

In another embodiment illustrated in FIG. 4, the automated control module 162 is electrically coupled to the machine controller 126 via a wireless interface. In the embodiment shown, the automated control module 162 includes a wireless communication device 180 that is configured to interface or talk to a wireless communication device 182 "on-board" the power machine.

The wireless communication devices 180, 182 wirelessly transmit and receive data or information through known communication protocols. In the embodiment shown, the wireless communication device 180 coupled to the automated control module 162 transmits the universal control signal 166 to the wireless communication device 182 coupled to the machine controller 126. The machine controller 126 receives the universal control signal 166 and generates a device control signal to operate devices or motors "on-board" the power machine.

In an alternate embodiment, the wireless communication component 180 is separate from the automated control module 162 and is electrically connected to the automated control module 162 for use. Similarly, the wireless communication device 182 can be an integral component of the machine controller 126 or separately attached.

Figure 5:
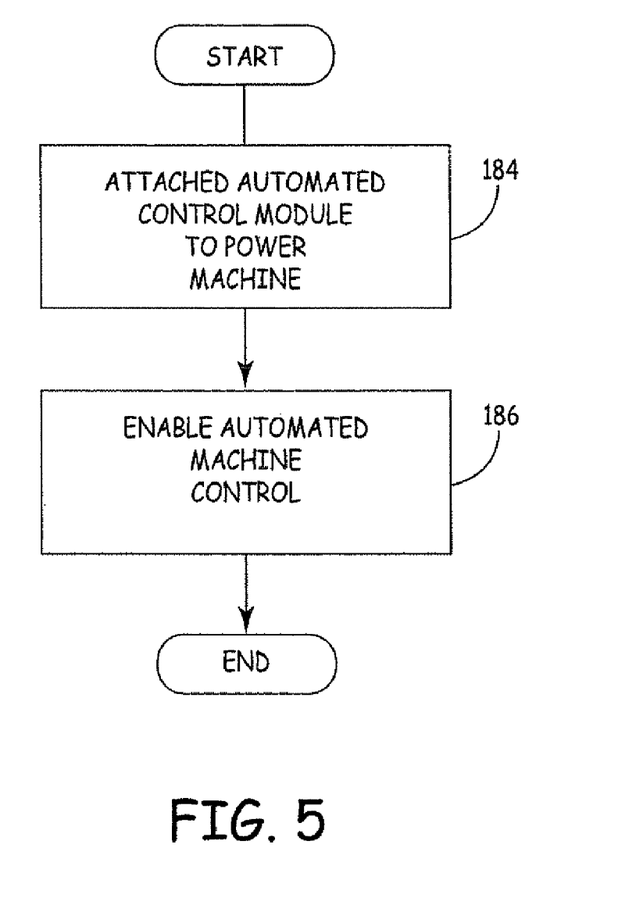
FIG. 5 is a flow chart illustrating an embodiment for implementing automated machine control.

FIG. 5 is a flow chart of an illustrated embodiment of an automated control assembly. As shown in step 184, the automated control module 162 is attached to the power machine to provide automated control. The automated control module 162 can be attached to the one or more lift arms as illustrated in FIG. 3 via a mounting bracket (not shown in FIG. 5). Sensors 164 are connected to the automated control module 162 to provide position input as described. Sensors 164 can be connected prior to or following attachment of the automated control module 162 to the power machine.

In step 186 in FIG. 5, the automated control module 162 is enabled to implement automated control. In the illustrated embodiment, the automated control module is electrically coupled to the machine controller 126 to transmit and/or receive data as described. In the embodiments illustrated, the automated control module 162 is electrically coupled to the machine controller 12 by plugging connector plug 174 into socket 176 or via a wireless interface. Thereafter automated control is enabled via control selector 168 as previously illustrated in FIG. 2.

Figure 6:
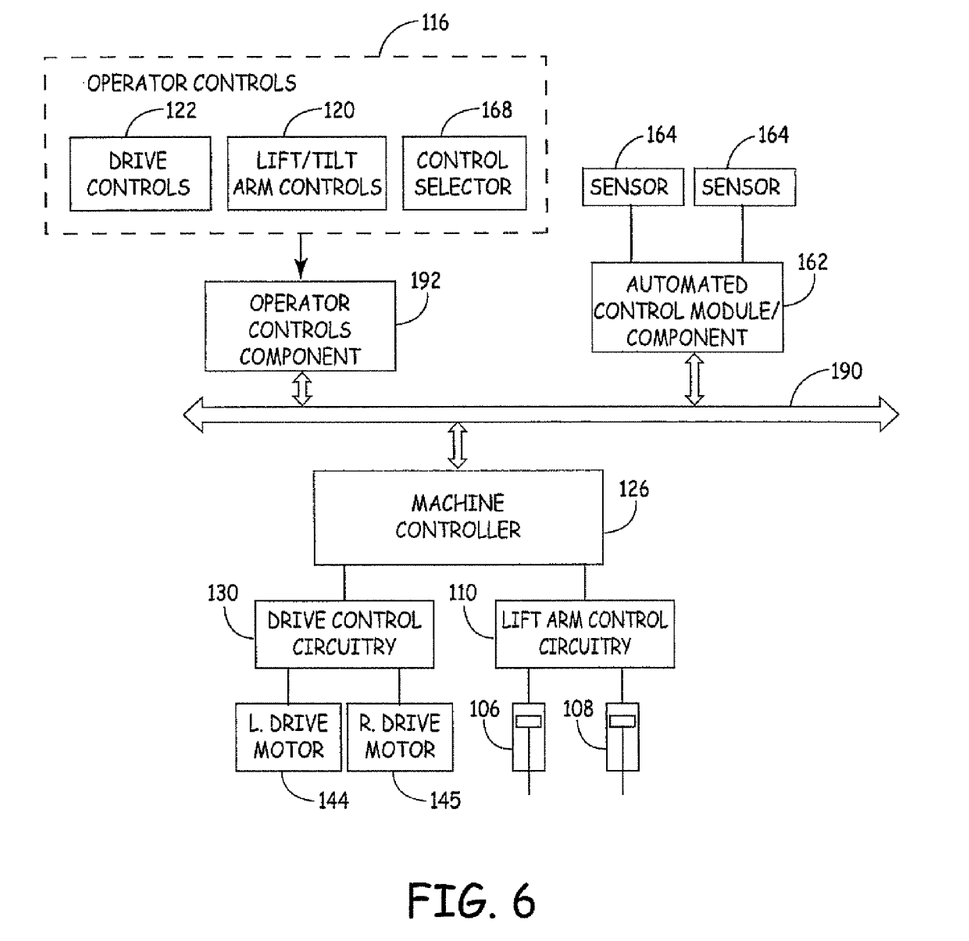
FIG. 6 is a schematic illustration of an automated machine control module or assembly connected to a machine controller or component through a controller area network (CAN).

FIG. 6 schematically illustrates an embodiment of an automated control assembly including an automated control module 162 that is implemented through a controller area network. (CAN). In the illustrated embodiment, the automated control module 162 is connected to a controller area network bus 190 to communicate with machine controller 126 on the CAN bus 190. As shown, input from the operator controls 116 is also transmitted to the machine controller 126 through the CAN bus 190 via an operator controls component 192. The illustrated machine controller 126 receives input from the operator controls 116 or automated control module 162 and outputs a control signal to operate actuator devices 106, 108, 145, 146 or other devices of the power machine.

Although a particular machine controller is shown, application is not limited to interface with the particular machine controller 126 shown and other embodiment can be utilized to implement embodiments of the present invention.

Although the present invention has been described with reference to preferred embodiments, workers skilled in the art will recognize that changes may be made in form and detail without departing from the spirit and scope of the invention.

What is claimed is:

1. An assembly for a power machine comprising:
   an automated control module configured to receive an input signal from at least one sensor and generate an automated control command responsive to the input signal from the at least one sensor;
   a control selection component configured to receive a control selection input from a control selector providing one of an automated control mode selection and an operator control mode selection;
   a machine control assembly operably coupled to the power machine to control one or more functions of the power machine and the machine control assembly is configured to receive the control selection input from the control selector and if the input control selection is the automated control mode selection, the machine control assembly utilizes the automated control command from the automated control module to provide a device control signal responsive to the automated control command to operate the one or more functions of the power machine and if the input control selection is the operator control mode selection, the machine control assembly utilizes an operator control command from an operator input device to provide the device control signal to operate the one or more functions of the power machine; and
   a communication interface configured to transmit the automated control command to the machine control assembly to generate the device control signal utilizing the automated control command.

2. The assembly of claim 1 wherein the communication interface comprises:
   a connector assembly including an electrical cable and a connector plug configured to provide an electrical connection between the automated control module and the machine control assembly to transmit the automated control command to the machine control assembly.

3. The assembly of claim 2 wherein the connector plug and cable are connected to the automated control module and the connector plug is insertable into a socket on the power machine.

4. The assembly of claim 2 wherein the automated control module is removably connectable to the power machine.

5. The assembly of claim 1 wherein the automated control command is generated based upon a position signal provided from the at least one sensor with respect to a reference position.

6. The assembly of claim 1 wherein the at least one sensor is on an arm or boom assembly of the power machine to provide location input to the automated control module and the power machine includes a hydraulic assembly including one or more hydraulic cylinders coupled to the arm or boom assembly and if the input control selection is the automated control mode selection, the device control signal is generated utilizing the location input to actuate the one or more hydraulic cylinders to move the arm or boom assembly and if the input control selection is the operator control mode selection, the device control signal is generated to actuate the one or more hydraulic cylinders utilizing the operator control command from the operator input device.

7. The assembly of claim 1 wherein the power machine comprises a hydraulic drive assembly including one or more hydraulic motors and the device control signal is configured to energize the one or more hydraulic motors to provide forward, reverse and steer motion to drive and steer the power machine and if the input control selection is the automated control mode selection, the device control signal is generated utilizing the input signal from the at least one sensor and if the input control selection is the operator control mode selection, the device control signal is generated utilizing the operator control command from the operator input device.

8. The assembly of claim 1 wherein the communication interface comprises a wireless interface.

9. The assembly of claim 1 wherein the at least one sensor includes a laser receiver.

10. The assembly of claim 1 wherein the automated control module is coupled to the machine control assembly through a controller area network bus.

11. A control assembly for a power machine comprising
   an automated control module configured to receive a location input signal from at least one sensor element on a component of the power machine movable relative to a body portion of the power machine to provide an input position of the movable component relative to the body portion of the power machine, wherein the automated control module is configured to generate an automated control command to energize one or more actuator devices to move the component relative to the body portion of the power machine utilizing the location input signal;
   a machine control assembly coupled to the one or more actuator devices on the power machine and configured to receive the automated control command and use the automated control command to generate a control signal to control circuitry to energize the one or more actuator devices to move the component utilizing the automated control command in one operating mode and to use a user control command from a user input device to energize the one or more actuator devices to move the movable component in another operating mode; and
   a communication interface between the automated control module and the machine control assembly to transmit the automated control command to the machine control assembly coupled to one or more actuator devices on the power machine.

12. The control assembly of claim 11 comprising a selector device including an automated control mode selection wherein the machine control assembly generates the control signal utilizing the automated control command and an operator control mode selection wherein the machine control assembly generates outputs the control signal utilizing the user control command.

13. The control assembly of claim 11 wherein the machine control assembly interfaces with the automated control module through a controller area network bus.

14. The control assembly of claim 11 wherein the movable component is an arm or boom assembly movably coupled to the body portion of the power machine and the machine control assembly receives the automated control command from the automated control module and generates a hydraulic control signal to energize a hydraulic actuator coupled to the arm or boom assembly of the power machine to move the arm or boom assembly.

15. The control assembly of claim 11 wherein the communication interface comprises a connector assembly including an electrical cable and a connector plug configured to provide an electrical connection between the automated control module and the machine control assembly to transmit the automated control command.

16. The control assembly of claim 15 wherein the electrical cable is coupled to the automated control module and the connector plug is insertable into a socket on the power machine.

17. A control assembly for a power machine comprising:
an automated control module configured to receive an input signal from at least one sensor and generate an output control command based upon the input signal;
a machine control assembly coupled to one or more drive motors on the power machine to drive and steer the power machine and the machine control assembly is configured to receive the output control command from the automated control module and a user command from a user input device and the machine control assembly is configured to utilize the output control command from the automated control module to generate a control signal to energize the one or more actuator drive motors to drive and steer the power machine in one operating mode and to utilize the user command from the user input device to generate the control signal to energize the one or more drive motors in another operating mode; and
a communication interface between the automated control module and the machine control assembly configured to transmit the output control command from the automated control module to the machine control assembly coupled to the one or more drive motors on the power machine.

18. The control assembly of claim 17 wherein the communication interface includes a wireless communication device configured to wirelessly transmit the output control command to the machine control assembly to generate the control signal to energize the one or more drive motors to drive and steer the power machine.

19. The control assembly of claim 17 wherein the automated control module is removably connectable to the power machine.

20. The control assembly of claim 17 wherein the user input device is coupled to the machine control assembly through a controller area network bus.

* * * * *